United States Patent [19]

Wakai et al.

[11] Patent Number: 4,983,455

[45] Date of Patent: Jan. 8, 1991

[54] MAGNETIC RECORDING MEDIUM AND PROCESS FOR PRODUCING THE SAME

[75] Inventors: Kunio Wakai, Kitasoma; Tetsuo Mizumura, Toride, both of Japan

[73] Assignee: Hitachi Maxell, Ltd., Tokyo, Japan

[21] Appl. No.: 155,483

[22] Filed: Feb. 12, 1988

[30] Foreign Application Priority Data

| Feb. 14, 1987 | [JP] | Japan | 62-31893 |
| Sep. 19, 1987 | [JP] | Japan | 62-236036 |
| Oct. 9, 1987 | [JP] | Japan | 62-253823 |
| Oct. 16, 1987 | [JP] | Japan | 62-259500 |

[51] Int. Cl.$^5$ .................................. G11B 23/00
[52] U.S. Cl. .................. 428/336; 428/694; 428/695; 428/900
[58] Field of Search ............ 428/694, 425.9, 422.8, 428/695, 336, 900

[56] References Cited

U.S. PATENT DOCUMENTS

| 4,074,012 | 2/1978 | Heikkinen | 428/900 |
| 4,315,057 | 2/1982 | Horigome | 428/900 |
| 4,425,404 | 1/1984 | Suzuki | 428/900 |
| 4,464,279 | 8/1984 | Arai | 428/695 |
| 4,520,651 | 7/1985 | Kitoo | 428/900 |
| 4,668,587 | 5/1987 | Sumiya | 428/694 |
| 4,677,023 | 6/1987 | Ishizaki | 428/694 |
| 4,698,280 | 10/1987 | Mine | 428/695 |
| 4,701,375 | 10/1987 | Nishimatsu | 428/695 |
| 4,746,559 | 5/1988 | Nishikawa | 428/695 |

FOREIGN PATENT DOCUMENTS

| 58-194135 | 11/1983 | Japan . |
| 59-19233 | 1/1984 | Japan . |
| 59-19234 | 1/1984 | Japan . |
| 59-19235 | 1/1984 | Japan . |
| 60-89815 | 5/1985 | Japan . |
| 61-131219 | 6/1986 | Japan . |
| 202326 | 9/1987 | Japan . |

OTHER PUBLICATIONS

"Improvement of Corrosion Resistance of CoNi Thin Films by Surface Passivation", by Wakai, J. Applied Phys., Apr. 15, 1987.

*Primary Examiner*—Paul J. Thibodeau
*Attorney, Agent, or Firm*—Antonelli, Terry, Stout & Kraus

[57] ABSTRACT

The invention provides a magnetic recording medium having a ferromagnetic metallic layer provided on a non-magnetic substrate, and an anticorrosive deposited on said ferromagnetic metallic layer containing a benzotriazole derivative as a main component. A magnetic recording medium is also provided having on a substrate, a ferromagnetic metallic layer containing cobalt as a main component, a passivated cobalt layer on said ferromagnetic metallic layer and an anticorrosive layer on said passivated cobalt layer, said anticorrosive layer comprising at least one anticorrosive selected from benzothiazole derivatives, benzoimidazole derivatives haaving at least one of amino group, nitro group, chlorine and mercapto group as substituent in the benzoimidazole skeleton, benzotriazole, compounds containing nitrosonaphthol as a main component, oxime compounds, phytic acid and its derivatives, quinaldinic acid and its derivatives, quinoline compounds, naphthaldehyde and its derivatives. A process for producing the same is also provided.

17 Claims, 2 Drawing Sheets

MAGNETIC RECORDING MEDIUM AND PROCESS FOR PRODUCING THE SAME

BACKGROUND OF THE INVENTION

1. Field of the Invention

This invention relates to a magnetic recording medium and a process for producing the same. More particularly, the invention relates to a magnetic recording medium having high corrosion resistance and excellent runnability (capability to run smoothly), and a process for producing such magnetic recording medium.

2. Description of the Prior Art

As the anticorrosives used for the purpose of improving corrosion resistance of ferromagnetic metallic films of magnetic recording media, there have been proposed aromatic carboxylic acids having amino groups (Japanese Patent Application Kokai (Laid-Open) No. 58-194131), cupferrons (Japanese Patent Application Kokai No. 58-194138), polyamines (Japanese Patent Application Kokai No. 59-3724), benzotriazoles (Japanese Patent Application Kokai No. 58-194135), etc., some of which have been put to practical use.

There are various environmental factors, such as humidity, sulfur dioxide (sulfurous acid gas), nitrogen oxides, etc., which cause corrosion of ferromagnetic metallic films. None of the above-mentioned anticorrosives has a complete anticorrosive potency against these corrosive factors, and it can hardly be said that they show a satisfactory anticorrosive effect in use under the present-day complex corrosive environments.

When the ferromagnetic metallic film is covered with a higher-valent oxide which has a relatively high anticorrosiveness in itself, use of an anticorrosive having a reducing effect could prove detrimental to the protection of metallic film as such anticorrosive has an aptitude to break the anticorrosive oxide layer. In the prior art, however, little regard has been paid to such matter in the selection of anticorrosive.

Thus, various problems such as mentioned above have remained unsolved in the prior art regarding corrosion protection of ferromagnetic metallic films.

As a result of studies on the corrosion mechanism of cobalt-based ferromagnetic metallic films and the method for preventing corrosion thereof, the present inventors had previously found that when the surface of such ferromagnetic metallic film is mildly oxidized in the presence of oxygen and moisture to form a passivated cobalt layer which is essentially a cobalt oxyhydroxide layer containing three- or higher-valent cobalt ions, remarkable improvements can be attained in corrosion resistance, running stability and durability (Japanese Patent Kokai (No. 62-275316). It was found, however, that the provision of such passivated cobalt coat alone is insufficient to cope with the deterioration of corrosion resistance which would be caused when such cobalt layer is damaged due to takeup of dust or abnormal sliding contact against the magnetic head during running of the tape in actual use thereof.

SUMMARY OF THE INVENTION

The present invention has for its object to solve said problems in the prior art and to provide a magnetic recording medium with improved corrosion resistance and a process for producing such a recording medium, or a magnetic recording medium also improved in its runnability or the ability to run smoothly by incorporating means for countervailing the possible deterioration of such runnability due to the anticorrosive measures, and a process for producing such a magnetic recording medium.

The object of the present invention can be attained by incorporating a benzotriazole derivative, especially one having at least one of amino group, nitro group, chlorine and mercapto group as a substituent in the benzotriazole, or a salt of benzotriazole with a carboxylic acid, with the ferromagnetic metallic film as an anticorrosive component.

Further studies by the present inventors for attaining this object have revealed the fact that an even greater improvement can be realized by providing a passivated cobalt layer on the ferromagnetic metallic film containing cobalt as a main component and further providing on said passivated cobalt layer a layer of at least one anticorrosive selected from benzothiazole derivatives, benzoimidazole derivatives having at least one of amino group, nitro group, chlorine and mercapto group in the benzoimidazole, benzotriazole and its derivatives, compounds containing nitrosonaphthol as a main component, oxime compounds, phytic acid, quinaldinic acid, naphthaldehyde and derivatives thereof, and quinoline compounds. For instance, when a layer of anticorrosive was provided on a previously described passivated cobalt film by coating it with one or more of the anticorrosives selected from 2-mercaptobenzothiazole, 2-phenylaminobenzineimidazole, 1,2,3-benzotriazole, 2-nitroso-1-naphthol, 1-nitroso-2-naphthol, salicylaldoxime, α-benzoinoxime, phytic acid, quinaldinic acid, 8-hydroxyquinoline, 2-methyl-8-hydroxyquinoline, naphthaldehyde and derivatives thereof, it was found to be possible to prevent deterioration of corrosion resistance should it be caused by damage to said passivated cobalt layer due to takeup of dust, abnormal friction against the magnetic head or other causes during running of the tape in actual use, thus realizing a remarkable improvement of corrosion resistance and durability of the ferromagnetic metallic film. It was also found that corrosion resistance and durability can be further improved by providing a lubricant layer on said anticorrosive layer formed on the passivated cobalt layer.

The anticorrosives using benzotriazole as main constituent are a so-called cathode inhibitor containing nitrogen. Their anticorrosive effect is based mainly on their inhibitory action against the hydrogen-generating reaction in the corrosion reactions caused by moisture and corrosive gases in the atmosphere.

Cupferrons and polyamines mentioned above can also serve as a cathode inhibitor. The difference between cupferrons or polyamines and the anticorrosives in their anticorrosive effect under the same corrosive conditions is considered due to the difference in their adsorptive affinity to ferromagnetic metals (weak adsorptive affinity provides little anticorrosive effect, but too strong adsorptive affinity rather helps to promote corrosion) as well as the differences in molecular structure (such as difference in covering rate due to stereo hindrance). The prominent anticorrosive effect of the benzotriazole derivatives is due to their advantages in these points. Incorporation of the aforementioned groups (amino group, nitro group, chlorine, mercapto group, etc.) as substituent has the effect of controlling the electron donating activity of the adsorbed atoms (nitrogen).

The benzotriazole derivatives have a greater protective effect for the higher-valent oxide layer on the ferromagnetic metallic film surface than benzotriazole itself and provide a greater improvement of corrosion resistance than the oxide layer per se.

DESCRIPTION OF THE PREFERRED EMBODIMENTS

The magnetic recording medium according to this invention will hereinafter be described with reference to the examples thereof along with the comparative examples.

EXAMPLE 1

On a 9 μm thick polyethylene terephthalate film substrate was deposited Co-Ni (80/20) to a thickness of 1,500 Å in an oxygen atmosphere to form a thin ferromagnetic metallic layer. This metallic layer was then coated with a 0.05 wt % methyl isobutyl ketone solution of benzotriazole stearate and dried to prepare a specimen.

EXAMPLE 2

The procedure of Example 1 was followed except that 5-nitro-benzotriazole was used instead of benzotriazole stearate to prepare a similar specimen.

EXAMPLE 3

The procedure of Example 1 was followed except that a passivated cobalt layer was formed on the surface of said ferromagnetic metallic layer before coating methyl isobutyl ketone solution to prepare another specimen.

Said passivated cobalt layer was formed by placing the Co-Ni deposited film in another vessel, evacuating the vessel to 20 Torr, then charging 1 atm. oxygen gas into it and keeping the film under this condition for 3 days.

COMPARATIVE EXAMPLE 1

A specimen was prepared by following the same procedure as Example 1 except that no coating of a methyl isobutyl ketone solution of benzotriazole stearate was made.

COMPARATIVE EXAMPLE 2

Another specimen was prepared by following the same procedure as Example 1 except that a cupferron was used instead of benzotriazole stearate.

COMPARATIVE EXAMPLE 3

Still another specimen was prepared by following the same procedure as Example 3 except that no coating of a methyl isobutyl ketone solution of benzotriazole stearate was made.

The six specimens were subjected to accelerated corrosion tests to compare their corrosion resistance. In these tests, two measurements were used to do this comparison, that is the reduction rate of saturation magnetization of each specimen after it has been kept in a 60° C. and 90% RH atmosphere for one week, and the sulfur content (atom %) in the magnetic layer of each specimen after it has been kept in a 35° C. and 75% RH atmosphere with 1.0 ppm of $SO_2$, 0.5 ppm of $H_2S$ and 1.0 ppm of $NO_2$ for 100 hours.

The results are shown in Table 1.

TABLE 1

| Specimen | Reduction rate of saturation magnetization (%) | Sulfur content (atom %) |
| --- | --- | --- |
| Example 1 | 9.3 | 4.6 |
| Example 2 | 8.9 | 5.0 |
| Example 3 | 4.1 | 5.8 |
| Comp. Example 1 | 31.2 | 55.6 |
| Comp. Example 2 | 23.2 | 48.9 |
| Comp. Example 3 | 5.6 | 54.8 |

The results of Table 1 attest to far higher corrosion resistance of the specimens prepared according to this invention (Examples 1–3) than the comparative specimens either when the specimens were kept in a high-temperature and high-humidity condition or kept in a corrosive gas atmosphere.

As regards the build-up of anticorrosive, it has been experimentally confirmed that a similar effect is produced when the build-up is in the range of 0.5 to 100 mg/m$^2$, the most preferred range being 1 to 50 mg/m$^2$.

In the above examples, there were taken up the cases where a salt of benzotriazole with a carboxylic acid and a benzotriazole derivative having a nitro group as substituent were used as anticorrosive, but the same result can be obtained when using benzotriazole derivatives having amino group, chlorine or mercapto group as substituent.

As described above, in accordance with this invention, an anticorrosive principally composed of a benzotriazole derivative having at least one of amino group, nitro group, chlorine and mecapto group as substituent or a salt of benzotriazole with a carboxylic acid is deposited on the ferromagnetic metallic layer formed on a non-magnetic substrate to provide a magnetic recording medium which is free of the problems of the prior art and shows an amazingly high corrosion resistance in use under the complex corrosive environments.

The invention will be further described below regarding its other significant embodiments.

In accordance with this invention, anticorrosive layer is formed on a passivated cobalt layer. This can be achieved, for instance, by dissolving an anticorrosive in a proper solvent such as toluene, methyl isobutyl ketone, methyl ethyl ketone, cyclohexane, ethyl acetate, ethyl alcohol, isopropyl alcohol, Freon, tetrahydrofuran, dimethylformamide, dioxane or the like, and dipping in this solution the ferromagnetic metallic film having formed thereon the passivated cobalt layer, or by applying this solution (by atomizing or other means) onto the ferromagnetic metallic film. Also, an anticorrosive may be deposited by vacuum evaporation or other means on the ferromagnetic metallic film having formed thereon said passivated cobalt layer. In other methods, an anticorrosive, instead of applying it directly onto the passivated cobalt layer, may be coated on the back coat or impregnated in the back coat provided on the back side of the substrate having a ferromagnetic metallic layer on its upper side, and the anticorrosive on or in this back coat may be transferred to the passivated cobalt layer when this laminate is wound up.

Illustrative examples of the anticorrosives usable in the above process include 2-mercaptobenzothiazole, 2-pentylaminobenzinimidazole, 1,2,3-benzotriazole, 2- nitroso-1-naphthol, 1-nitroso-2-naphthol, salicylaldoxime, α-benzoinoxime, phytic acid, quinaldinic acid, 8-hydroxyquinoline, naphthaldehyde and derivatives thereof. These compounds may be used either singly or in combination.

These anticorrosives have quite a remarkable anticorrosive potency, and they never cause any change of quality or deterioration of the passivated cobalt layer when they are applied on such a layer. Nor do they affect wear resistance of the passivated cobalt layer and ferromagnetic metallic layer. Therefore, when an anticorrosive surface layer is formed on the passivated cobalt layer, an admirable corrosion protective effect is provided. Even if the passivated cobalt layer should be damaged due to takeup of dust or abnormal frictional contact against the magnetic head during running of the tape, the anticorrosive layer can effectively control or minimize the deterioration of corrosion resistance caused by the damage, allowing maintenance of high enough corrosion resistance and durability of said film. Further, this type of anticorrosive gives no adverse effect to the lubricant layer which may be formed thereon, so that when a lubricant layer is formed on the anticorrosive layer, the lubricant can perform its activity to the fullest measure, providing a further improvement of corrosion resistance and durability.

The thickness of the layer of anticorrosive formed on the passivated cobalt layer should be in the range of 20 to 200 Å. When this thickness is less than 20 Å, the desired effect of the layer may not be obtained, while when the thickness is greater than 200 Å, a too large spacing loss may be caused to give an ill effect to the electro-magnetic conversion characteristics.

To form a passivated cobalt layer on the ferromagnetic metallic film, the surface of the ferromagnetic metallic film mainly composed of cobalt is subjected to a moisture absorption treatment and a dehydrating-oxidization treatment either simultaneously or separately. In case both treatments are conducted simultaneously, since the contradictory steps of moisture absorption and dehydration are performed at the same time, the operations must be carried out at a low humidity below 50% RH under heating at a temperature above 40° C. In this case, therefore, the operations tend to become difficult to control. In case the two treatments are carried out separately, such difficulty of control is eliminated.

The moisture absorption treatment can be achieved by exposing the ferromagnetic metallic layer to a moist atmosphere with a vapor pressure above $10^{-3}$ Torr. In case the layer is exposed under saturated vapor pressure, the moisture absorption is adjusted in the ensuing dehydration and drying step. However, considering the ordinary workability and other factors, this treatment is preferably performed by leaving the metallic layer in an atmosphere of 30–80% RH and room temperature for 0.1 to 24 hours.

In the dehydration and oxidation treatment, in order to accelerate the desired oxidation reaction, it is necessary to drive moisture out of the oxidation reaction system. It is therefore desirable to subject a ferromagnetic metallic layer to the oxidation reaction in a closed system and in a dry state. For performing the oxidation reaction in a dry state, such reaction may be carried out in vacuo under an atmosphere mostly composed of oxygen such as pure oxygen gas or in the presence of a dessicant. Such reaction may be also conducted by passing a heated oxygen gas. In case of carrying out the reaction in a closed system by using, for example, a closed vessel, this vessel is once evacuated to a vacuum below 100 Torr, preferably below 50 Torr, and then the reaction is conducted in an atmosphere containing 50% or more of oxygen gas by partial pressure or under pressure below 2 atm. It is not necessary to supply 100% oxygen gas in the course of oxidation reaction; it is possible to use a mixed gas containing 50% or more of oxygen gas by partial pressure, the rest consisting of inert gases such as Ar gas, $N_2$ gas, etc.

With this moisture absorption treatment and dehydrating/oxidation treatment, a passivated cobalt layer which is essentially a cobalt oxyhydroxide layer containing three- or higher-valent cobalt ions such as expressed by the chemical formula $Co_3O_4.nH_2O$ or $Co_2O_3.nH_2O$ is formed on the ferromagnetic metallic film. This passivated cobalt layer serves as protecting barrier for the ferromagnetic metallic layer against corrosion, thereby greatly improving the corrosion resistance runnability and durability of the magnetic recording medium.

As described above, the magnetic recording medium is greatly improved in durability and corrosion resistance by providing an anticorrosive layer on the passivated cobalt layer provided on the ferromagnetic metallic layer. When a lubricant layer is further formed on the anticorrosive layer, the coefficient of friction is reduced due to the lubricating effect of the lubricant layer, providing an even greater improvement of wear resistance.

Such lubricant layer can be formed in various ways. For instance, a lubricant is dissolved in a proper solvent such as toluene, methyl isobutyl ketone, methyl ethyl ketone, cyclohexanone, ethyl acetate, tetrahydrofuran, dimethylformamide, dioxane, etc., and the anticorrosive layer is dipped in this solution, or this solution is applied or atomized onto the anticorrosive layer. Also, a lubricant may be deposited by vacuum evaporation on the anticorrosive layer. Such lubricant layer formed on the anticorrosive layer in the manner described above can well display its lubricating effect to reduce the coefficient of friction, realizing a further improvement of wear resistance.

The lubricant used in this invention may be aliphatic, fluorine, silicone and hydrocarbon type, all of which can be favorably used for the purpose of this invention. Aliphatic lubricants include fatty acids and metal salts thereof, fatty acid esters, fatty acid amides, aliphatic alcohols, etc. Preferred examples of fatty acids are lauric acid, myristic acid, palmitic acid, stearic acid and behenic acid. As the metal salts of fatty acids, there can be favorably used magnesium salt, aluminum salt, lithium salt, sodium salt, calcium salt, cobalt salt, zinc salt, barium salt and lead salt of said fatty acids. Aliphatic acid esters include butyl stearate, octyl myristinate, monoglyceride stearate, monoglyceride palmitate, monoglyceride oleate and the like. As for fatty acid amides, caproic acid amide, capric acid amide, lauric acid amide, palmitic acid amide, behenic acid amide, oleic acid amide, linoleic acid amide, methylenebisstearic acid amide and the like can be favorably used. Stearyl alcohol, myristyl alcohol and the like are preferably used as aliphatic alcohols. Chlorides such as trimethylstearylammonium chloride, stearoyl chloride, etc., and amines such as stearylamine, stearylamine acetate, stearylamine hydrochloride, etc., are also usable as aliphatic lubricants.

The fluorine lubricants suited for use in this invention include trichlorofluoroethylene, perfluoropolyether, perfluoroalkylpolyether, perfluoroalkylcarboxylic acids and the like. Among the commercial products of this type of lubricant are Daifluoil #20 by Daikin Corp., Krytox M, Krytox H and Vydax AR by Du Pont, and Fomblin Z, Fomblin Z DOL by Montedison, and Fomblin V84/20 by Hoechst.

The silicone lubricants usable in this invention include silicone oil, modified silicone oil and the like.

Paraffin, squalane, wax, etc., can be suitably used as a hydrocarbon lubricant in this invention.

The thickness of the lubricant layer formed by using said type of lubricant is preferably not less than 20 Å for producing sufficient effect of lubrication to noticeably improve wear resistance. It should be noted, however, that when the total thickness of the lubricant layer and the anticorrosive layer formed on the passivated cobalt layer exceeds 1,000 Å, a large spacing loss may cause deterioration of the read-write characteristics. Therefore, the lubricant layer thickness should be so selected that the total thickness of both lubricant and anticorrosive layers will not exceed 1,000 Å.

The magnetic recording medium of this invention may have, if necessary, a back coat on the underside of the substrate which has on its upper side a ferromagnetic metallic film. A coating material for such back coat is prepared by mixing and dispersing a filler such as red iron oxide, barium sulfate, calcium carbonate, carbon black or the like along with a binder and an organic solvent, and such coating material is applied to the back side of the substrate and dried to form a back coat. Various types of commonly used additives such as dispersant, lubricant, abrasive, antistatic agent, etc., may be properly added in said coating material.

The ferromagnetic metallic layer is preferably made of Co or a Co alloy such as Co-Cr alloy, Co-Ni alloy, Co-P alloy, Co-Fe alloy, Co-Fe-Cr alloy, etc., in which Co is the primary constituent. Such Co-based magnetic metallic layer is formed on the substrate film by such means as vacuum deposition, ion plating, sputtering and plating.

The magnetic recording media provided according to this invention include the magnetic tapes and magnetic discs using a synthetic resin film such as polyester film, polyimide film, etc., as base; magnetic discs and magnetic drums using as base a disc or drum formed from a synthetic resin film, aluminum plate, glass plate, etc.; magnetic cards, and all other types of recording media having a structure designed to contact slidingly with the magnetic head.

EXAMPLES 4–15

Figure 1:
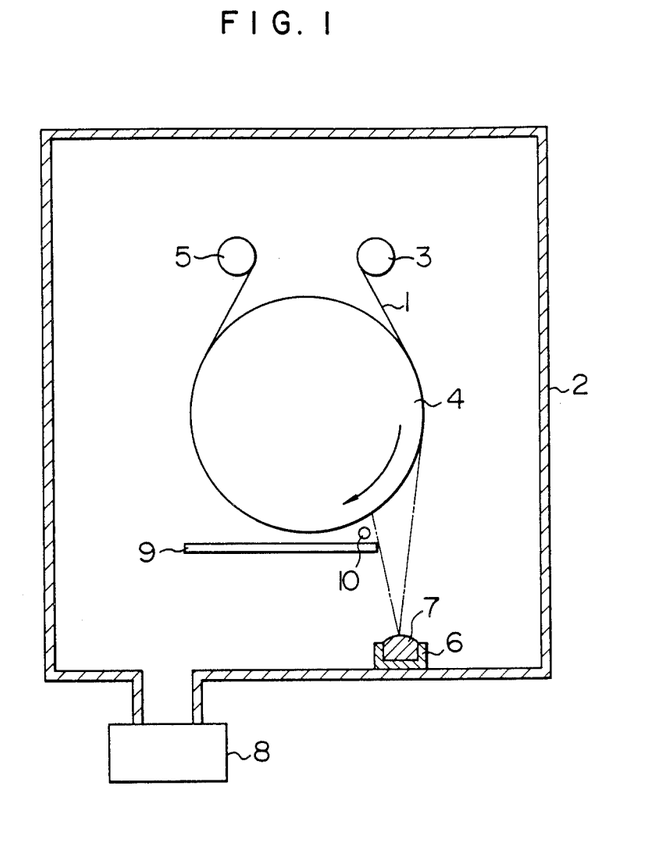
FIG. 1 is a schematic sectional view of the vacuum evaporator used in this invention.

By using a vacuum deposition apparatus shown in FIG. 1, a 12 μm thick polyester film 1 was delivered out from a stock roll 3 so that said film would move along the periphery of a cylindrical can 4 and be wound up on a take-up roll 5, all said elements being set in a vacuum chamber 2. Also, a cobalt-nickel alloy (80:20 by atomic ratio) 7 was set in a ferromagnetic material evaporation source 6 disposed at the bottom of said vacuum chamber 2. Then the vacuum chamber 2 was evacuated to $5 \times 10^{-5}$ Torr by an exhaust system 8 connected to said vacuum chamber 2, and oxygen gas was introduced from an oxygen gas supply pipe 10 passed between said cylindrical can 4 and a deposition preventing plate 9 disposed immediately therebelow. Cobalt-nickel alloy 7 in the ferromagnetic material evaporation source 6 was heated and vacuum deposition was done in the oxygen atmosphere of $1.5 \times 10^{-4}$ Torr, thus forming a 1,400 Å thick ferromagnetic metallic layer on the polyester film 1.

The polyester film 1 having thus deposited thereon said ferromagnetic metallic layer composed of cobalt-nickel alloy was taken out of the vacuum chamber 2 and left under the conditions of 25° C. and 60% RH for 3 hours for allowing moisture absorption. Thereafter, said polyester film 1 was placed in a closed vessel and the vessel was evacuated to 15 Torr for dehumidification. Then 1.2 atm. dry oxygen gas was charged into the vessel. The vessel has been kept in this condition for one week to let a mild oxidation reaction proceed, forming a passivated cobalt layer on the surface of the ferromagnetic metallic layer. XPS analysis of this passivated cobalt layer showed that this layer was made of cobalt oxyhydroxide substantially comprising three- or higher-valent cobalt ions although containing a slight amount of divalent cobalt ions. The ferromagnetic metallic layer on which said passivated cobalt layer had been formed had a saturated magnetic flux density of 6,450 gausses and a coercive force of 1,050 Oe.

Then the solutions prepared by dissolving the anticorrosive compounds listed in Table 2 below in the solvents such as benzene, methyl isobutyl ketone, ethyl alcohol, tetrahydrofuran, etc., to a concentration of $5 \times 10^{-3}$ mol/l were applied on the ferromagnetic metallic layer having said passivated cobalt layer thereon and dried to form an approximately 100 Å thick anticorrosive layer.

Thereafter a solution prepared by dissolving a 1:1 mixture of Fomblin Z DOL (a fluorine oil produced by Montedison) and Fomblin V84/20 (a fluorine solid produced by Hoechst) in Fluorinert FC77 (a Freon solvent produced by Sumitomo 3M) to a concentration of 0.5 g/l was applied on the anticorrosive layer and dried to form an approximately 100 Å thick lubricant layer composed of Fomblin Z-DOL and Fomblin V84/20.

Figure 2:
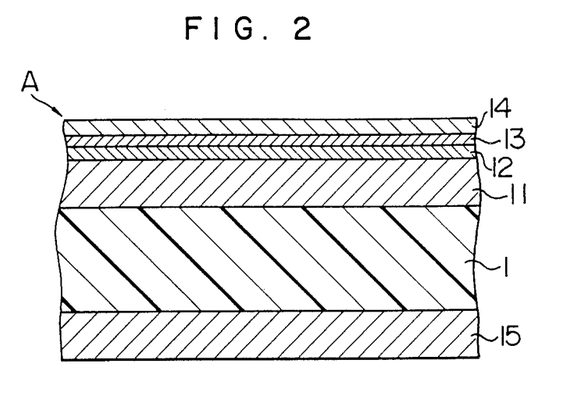
FIGS. 2 and 3 are the partial enlarged sectional views of the magnetic tapes obtained according to this invention.

Then the coating solution for back coat was applied to the back side of each polyester film having the ferromagnetic metallic layer thereon and dried to form a 1.0 μm thick back coat. The laminate was then slit into a prescribed width to make a magnetic tape A in which a ferromagnetic metallic layer 11, a passivated cobalt layer 12, an anticorrosive layer 13 and a lubricant layer 14 were laminated successively on the polyester film 1 and a back coat 15 was formed on the back side of said polyester film 1 as shown in FIG. 2.

TABLE 2

| | Anticorrosive |
| --- | --- |
| Example 4 | 2-mercaptobenzothiazole |
| Example 5 | 2-pentylaminobenzineimidazole |
| Example 6 | 1,2,3-benzotriazole |
| Example 7 | 2-nitroso-1-naphthol |
| Example 8 | 1-nitroso-2-naphthol |
| Example 9 | salicylaldoxime |
| Example 10 | α-benzoinoxime |
| Example 11 | phytic acid |
| Example 12 | quinaldinic acid |
| Example 13 | 8-hydroxyquinoline |
| Example 14 | 2-methyl-8-hydroxyquinoline |
| Example 15 | naphthaldehyde |

| Coating material for back coat | |
| --- | --- |
| Vulcan XC-72 (carbon black produced by Cabot) | 300 parts by weight |

-continued

| Coating material for back coat | |
|---|---|
| VAGH (vinyl chloride-vinyl acetate-vinyl alcohol copolymer produced by U.C.C.) | 100 parts by weight |
| N-2301 (urethane resin produced by Nippon Polyurethane Kogyo KK) | 70 parts by weight |
| Coronate L (trifunctional low-molecular isocyanate compound produced by Nippon Polyurethane Kogyo) | 30 parts by weight |
| Myristic acid | 10 parts by weight |
| Stearic acid-n-butyl | 5 parts by weight |
| Cyclohexanone | 750 parts by weight |
| Toluene | 750 parts by weight |

EXAMPLES 16-27

Figure 3:
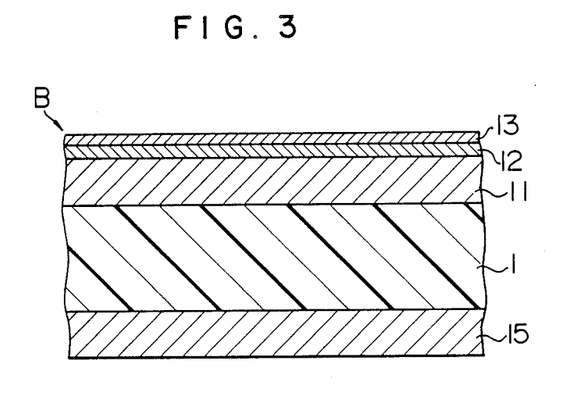

By following the same procedure as Examples 4-15 except that no lubricant layer was formed, the magnetic tapes B were made, in which a ferromagnetic metallic layer 11, a passivated cobalt layer 12 and anticorrosive layer 13 were laminated successively on a polyester film 1 and a back coat 15 was formed on the back side of the polyester film 1 as shown in FIG. 3.

COMPARATIVE EXAMPLE 4

A magnetic tape was made in the same way as Example 4 except that no anticorrosive layer was formed.

COMPARATIVE EXAMPLE 5

A magnetic tape was made in the same way as Example 4 except that 2-mercaptobenzothiazole was replaced by the same amount of lanolin fatty acid calcium soap for the anticorrosive layer, and that no passivated cobalt layer was formed.

COMPARATIVE EXAMPLE 6

A magnetic tape was made in the same way as Example 16 except that no anticorrosive layer was formed.

COMPARATIVE EXAMPLE 7

A magnetic tape was made in the same way as Example 16 except that 2-mercaptobenzothiazole was replaced by the same amount of triethanolamine for the anticorrosive layer, and that no passivated cobalt film was formed.

The coefficients of friction of the magnetic tapes obtained in the Examples and Comparative Examples were measured. The still lifes of the magnetic tapes were measured under the condition of 25° C. and 50% RH. The magnetic tapes were also subjected to a storage test in which each tape was run 300 times in full length in an 8 mm VTR EV-S700 (Sony) and then kept in a condition of 60° C. and 90% RH for 100 hours, and the change of jitter and the number of dropouts before and after the storage were measured. The tapes which showed a good result were indicated by O and those which showed an unsatisfactory result were indicated by X.

The results are shown in Table 3.

TABLE 3

| | Coefficient of friction | Still life | Storage test |
|---|---|---|---|
| Example 4 | 0.29 | over 30 min. | O |
| Example 5 | 0.32 | over 30 min. | O |
| Example 6 | 0.30 | over 30 min. | O |
| Example 7 | 0.29 | over 30 min. | O |
| Example 8 | 0.30 | over 30 min. | O |
| Example 9 | 0.28 | over 30 min. | O |
| Example 10 | 0.28 | over 30 min. | O |
| Example 11 | 0.31 | over 30 min. | O |
| Example 12 | 0.30 | over 30 min. | O |
| Example 13 | 0.28 | over 30 min. | O |
| Example 14 | 0.27 | over 30 min. | O |
| Example 15 | 0.28 | over 30 min. | O |
| Example 16 | 0.35 | over 30 min. | O |
| Example 17 | 0.37 | over 30 min. | O |
| Example 18 | 0.36 | over 30 min. | O |
| Example 19 | 0.34 | over 30 min. | O |
| Example 20 | 0.37 | over 30 min. | O |
| Example 21 | 0.37 | over 30 min. | O |
| Example 22 | 0.34 | over 30 min. | O |
| Example 23 | 0.34 | over 30 min. | O |
| Example 24 | 0.36 | over 30 min. | O |
| Example 25 | 0.37 | over 30 min. | O |
| Example 26 | 0.36 | over 30 min. | O |
| Example 27 | 0.37 | over 30 min. | O |
| Com. Example 4 | 0.29 | over 30 min. | X |
| Com. Example 5 | 0.37 | over 30 min. | X |
| Com. Example 6 | 0.36 | over 30 min. | X |
| Com. Example 7 | 0.37 | over 30 min. | X |

As seen from Table 3, all of the magnetic tapes obtained according to this invention (Examples 4-27) were equal to the comparative magnetic tapes (Comparative Examples 4-7) in coefficient of friction and still life and were better than such comparative tapes in the storage test. This indicates that the magnetic tapes obtained according to this invention have excellent durability and runnability and are greatly improved in corrosion resistance.

EXAMPLE 28

On a 9 μm thick polyethylene terephthalate film (substrate) was deposited Co-Ni (80/20) alloy to a thickness of 1,500 Å in an oxygen atmosphere to form a ferromagnetic metallic layer. On the surface of the metallic layer was fomed a passivated cobalt layer by a treatment in an atmosphere mainly composed of oxygen. Then a 0.05 wt % benzene solution of 2-nitroso-1-naphthol was applied on the passivated film and dried to prepare a specimen.

The passivated layer was formed in the following way: the substrate film on which the ferromagnetic metallic layer had been formed was placed in another vessel, and, after evacuating the vessel to 20 Torr, 1 atm. oxygen gas was charged in it.

The ferromagnetic metallic layer was kept in the vessel for 3 days.

EXAMPLE 29

A specimen was prepared by following the same procedure as Example 28 except that 1-nitroso-2-naphthol was used in place of 2-nitroso-1-naphthol.

COMPARATIVE EXAMPLE 8

A specimen was prepared by following the same procedure as Example 28 except that no 2-nitroso-1-naphthol solution was applied.

COMPARATIVE EXAMPLE 9

A specimen was prepared by following the same procedure as Example 28 except that no passivated cobalt layer was provided, and that no 2-nitroso-1-naphthol solution was applied.

COMPARATIVE EXAMPLE 10

A specimen was prepared by following the same procedure as Example 28 except that cupferron was used in place of 2-nitroso-1-naphthol.

COMPARATIVE EXAMPLE 11

A specimen was prepared by following the same procedure as Example 28 except that no passivated cobalt layer was provided.

For comparing the corrosion resistance, the six specimens were subjected to an accelerated corrosion tests. Two measurements were used to compare their corrosion resistance, that is the reduction rate of saturation magnetization of each specimen after keeping it in an atmosphere of 60° C. and 90% RH for one week, and the sulfur content (atom %) in the ferromagnetic layer of each specimen after keeping it in a 35° C. and 75% RH atmosphere with 1.0 ppm of $SO_2$, 0.5 ppm of $H_2S$ and 1.0 ppm of $NO_2$ for 100 hours.

The results are shown in Table 4.

TABLE 4

| Specimen | Reduction rate of saturation magnetization (%) | Sulfur content (atom %) |
|---|---|---|
| Example 28 | 5.1 | 4.3 |
| Example 29 | 5.6 | 5.0 |
| Comp. Example 8 | 5.6 | 54.8 |
| Comp. Example 9 | 31.2 | 55.6 |
| Comp. Example 10 | 23.2 | 48.9 |
| Comp. Example 11 | 13.2 | 6.0 |

The results of Table 4 show that the specimens provided with a nitrosonaphthol layer on a passivated layer formed on a magnetic layer (Examples 28 and 29) are smaller in both reduction rate of saturation magnetization and sulfur content, hence higher in corrosion resistance, than the specimens in which no nitrosonaphthol layer was provided on the passivated layer or a cupferron layer was provided instead of a nitrosonaphthol layer (Comparative Examples 8, 9 and 10) and the specimen in which no passivated cobalt layer was provided (Comparative Example 11).

EXAMPLE 30

A 2-nitroso-1-naphthol layer was provided on a passivated layer formed on the surface of a ferromagnetic metallic layer in the same way as Example 28, and then a 0.1 wt % Freon solution of Fomblin ZDOL (a fluorine lubricant produced by Montedison) was further applied on said 2-nitroso-1-naphthol layer to prepare a specimen.

EXAMPLE 31

A specimen was prepared in the same way as Example 30 except Fomblin ZDOL was replaced by Fomblin Z25 (Montedison).

EXAMPLE 32

A specimen was prepared in the same way as Example 30 except that Fomblin ZDOL was replaced by Fomblin AM 2001 (Montedison).

COMPARATIVE EXAMPLE 12

A specimen was prepared in the same way as Example 30 except that no nitrosonaphthol layer was provided.

COMPARATIVE EXAMPLE 13

A specimen was prepared in the same way as Example 30 except that the order of coating of Fomblin ZDOL and formation of nitrosonaphthol layer was reversed.

The above five specimens were subjected to an accelerated corrosion test and measured the reduction rate of saturation magnetization of each specimen after it has been left in an atmosphere of 60° C. and 90% RH for one week and the sulfur content (atom %) in the magnetic metallic layer of each specimen after it has been left in a 35° C. and 75% RH atmosphere with 1.0 ppm of $SO_2$, 0.5 ppm of $H_2S$ and 1.0 ppm of $NO_2$ for 100 hours. For evaluating the runnability, each specimen was slit into an 8 mm wide tape and was set at a winding angle of 90° round a 4 mm diameter SUS pin polished by a #2000 abrasive. The tape was slid round said pin reciprocatively 1000 times both ways under a load of 20 g and the coefficient of static friction after this test was measured.

The results are shown in Table 2.

TABLE 5

| Specimen | Reduction rate of saturation magnetization (%) | Sulfur content (atom %) | Coefficient of friction |
|---|---|---|---|
| Example 30 | 5.3 | 4.2 | 0.25 |
| Example 31 | 4.9 | 3.8 | 0.22 |
| Example 32 | 4.5 | 3.2 | 0.23 |
| Comp. Example 12 | 5.1 | 4.3 | ≈1.0 |
| Comp. Example 13 | 5.8 | 47.7 | 0.85 |

The results of Table 5 show that the specimens of this invention having a fluorine lubricant layer on a nitrosonaphthol layer provided on a passivated cobalt layer formed on a magnetic layer (Examples 3, 4 and 5) have better corrosion resistance and mobility than the specimens of Comparative Examples 12 and 13. Although 2-nitroso-1-naphthol was used for forming the nitrosonaphthol layer in the above examples, the same effect can be obtained by using 1-nitroso-2-naphthol.

Also, completely the same characteristic results were obtained when said nitrosonaphthol layer and fluorine lubricant layer were formed by directly coating them on their respective underlying layers or when they were applied to the back side of the substrate and transferred onto the respective underlying layers when the laminate was wound up. Thus, no difference was observed according to the method of application.

As described above, the present invention has made it possible to obtain a magnetic recording medium greatly improved in both corrosion resistance and runnability in comparison with the conventional ones by providing a passivated layer on a magnetic metallic layer and forming on the passivated layer an anticorrosive layer mainly composed of nitrosonaphthol or by further providing a fluorine lubricant layer on the anticorrosive layer. There was also established a process for producing such a magnetic recording medium.

EXAMPLE 33

On a 9 μm thick polyethylene terephthalate film substrate was deposited Co-Ni (80/20) to a thickness of 1,500 Å in an oxygen atmosphere to form a ferromagnetic metallic layer. On the surface of the metallic layer was formed a passivated cobalt layer by an oxygen-based atmosphere treatment. Then a 0.05 wt % methyl isobutyl ketone solution of 2-amino-benzoimidazole was coated on said passivated cobalt layer and dried to prepare a specimen.

The passivated cobalt layer was formed by placing the ferromagnetic metallic layer formed on the substrate film in another vessel and, after evacuating the vessel to 20 Torr, 1 atm. oxygen gas was charged thereinto, subjecting the metallic layer to a treatment under this atmosphere for 3 days.

EXAMPLE 34

A specimen was prepared in the same way as Example 33 except that no passivated cobalt layer was formed.

EXAMPLE 35

A specimen was prepared in the same way as Example 33 except that 2-amino-benzoimidazole was replaced by 5-nitro-benzoimidazole.

COMPARATIVE EXAMPLE 14

A specimen was prepared in the same way as Example 33 except that no coating of 2-amino-benzoimidazole solution was made.

COMPARATIVE EXAMPLE 15

A specimen was prepared in the same way as Example 34 except that no coating of 2-amino-benzoimidazole was made.

COMPARATIVE EXAMPLE 16

A specimen was prepared in the same way as Example 33 except that 2-amino-benzoimidazole was replaced by cupferron.

The six specimens were subjected to an accelerated corrosion test to compare the corrosion resistance. As in the previous examples, the reduction rate of saturation magnetization of each specimen after it has been kept in a 60° C. and 90% RH atmosphere for one week and the sulfur content (atom %) in the magnetic metallic layer of each specimen after it has been kept in a 35° C., 75% RH atmosphere with 1.0 ppm of $SO_2$, 0.5 ppm of $H_2S$ and 1.0 ppm of $NO_2$ for 100 hours were measured.

The results are shown in Table 6.

TABLE 6

| Specimen | Reduction rate of saturation magnetization (%) | Sulfur content (atom %) |
| --- | --- | --- |
| Example 33 | 5.1 | 5.0 |
| Example 34 | 12.7 | 4.2 |
| Example 35 | 5.3 | 5.9 |
| Comp. Example 14 | 5.6 | 54.8 |
| Comp. Example 15 | 31.2 | 55.6 |
| Comp. Example 16 | 5.7 | 48.9 |

TABLE 6-continued

| Specimen | Reduction rate of saturation magnetization (%) | Sulfur content (atom %) |
| --- | --- | --- |

The results of Table 6 show that the specimens having a benzoimidazole derivative layer on the magnetic layer (Examples 33–35) are less in reduction rate of saturation magnetization and sulfur content than the specimens having no benzoimidazole derivative layer on the magnetic layer or having a cupferron layer in place of said benzoimidazole derivative layer (Comparative Examples 14–16). It is also seen that the specimen having a benzoimidazole derivative layer on a passivated layer formed on a magnetic layer (Example 33) has the best corrosion resistance.

EXAMPLE 36

A 2-mercapto-benzoimidazole layer was formed on a passivated cobalt layer provided on a ferromagnetic metallic layer in the same way as Example 33 except that 2-mercapto-benzoimidazole was used in place of 2-amino-benzoimidazole, and then a 0.1 wt % Freon solution of Fomblin ZDOL (a fluorine lubricant produced by Montedison) was applied on said 2-mercapto-benzoimidazole layer to prepare a specimen.

EXAMPLE 37

A specimen was prepared in the same way as Example 36 except that Fomblin ZDOL was replaced by Fomblin Z25 (Montedison).

EXAMPLE 38

A specimen was prepared in the same way as Example 36 except that Fomblin ZDOL was replaced by Fomblin AM 2001 (Montedison).

COMPARATIVE EXAMPLE 17

A specimen was prepared in the same way as Example 36 except that no 2-mercapto-benzoimidazole layer was provided.

COMPARATIVE EXAMPLE 18

A specimen was prepared in the same way as Example 36 except that the coating of Fomblin ZDOL preceded the formation of 2-mercapto-benzoimidazole layer.

The above five specimens were subjected to an accelerated corrosion test in which the reduction rate of saturation magnetization and sulfur content were measured under the same conditions as in the preceding examples. For evaluating the runnability, each specimen was slit into an 8 mm wide tape and was set at a winding angle of 90° round a 4 mm diameter SUS pin polished by #2000 abrasive. The tape was slid around the pin reciprocatively 1,000 times both ways under a load of 20 g and the coefficient of static friction was measured.

The results are shown in Table 7.

TABLE 7

| Specimen | Reduction rate of saturation magnetization (%) | Sulfur content (atom %) | Coefficient of friction |
| --- | --- | --- | --- |
| Example 36 | 5.4 | 5.6 | 0.24 |
| Example 37 | 5.3 | 5.0 | 0.22 |
| Example 38 | 4.8 | 4.2 | 0.23 |

TABLE 7-continued

| Specimen | Reduction rate of saturation magnetization (%) | Sulfur content (atom %) | Coefficient of friction |
|---|---|---|---|
| Comp. Example 17 | 5.8 | 53.8 | 0.28 |
| Comp. Example 18 | 5.6 | 46.6 | 0.78 |

The results of Table 7 show that the specimens prepared by providing a 2-mercapto-benzoimidazole layer on a passivated cobalt layer on a magnetic metallic layer and further providing on said 2-mercapto-benzoimidazole layer a fluorine lubricant layer (Examples 36, 37 and 38) are better in corrosion resistance and runnability than the specimens of Comparative Examples 17 and 18.

The same results were obtained when the benjzoimidazole derivative layer and the fluorine lubricant layer were formed by applying them directly to their respective underlying layers or when they were applied to the back side of the substrate and transferred onto the respective underlying layers when the laminate was wound up. Thus, no difference was seen in characteristics of the products according to the method of application of the layers.

As described above, in accordance with this invention, there could be obtained a magnetic recording medium free of the defects of the prior art and markedly improved in both corrosion resistance and runnability by providing a passivated cobalt layer on the surface of a ferromagnetic metallic layer formed on a non-magnetic substrate and depositing on the passivated cobalt layer an anticorrosive principally composed of a benzoimidazole derivative having at least one of amino group, nitro group, chloro group and mercapto group as substituent in the benzoimidazole skeleton or by further providing on the anticorrosive layer a fluorine lubricant layer. A process for producing such magnetic recording medium was also established.

What is claimed is:

1. A magnetic recording medium having a ferromagnetic metallic layer provided on a non-magnetic substrate, which comprises an anticorrosive layer having a thickness of 20 to 200Å deposited on said ferromagnetic metallic layer containing a benzotriazole derivative having at least one of amino group, nitro group, chlorine or mercapto group as substituent in the benzotriazole skeleton as a main component.

2. A magnetic recording medium according to claim 1, wherein before depositing an anticorrosive containing a benzotriazole derivative as a main component on said ferromagnetic metallic layer, a passivated layer is formed on the surface of said ferromagnetic metallic layer.

3. A magnetic recording medium according to claim 1, wherein the benzotriazole derivative is 5-nitrobenzotriazole.

4. A magnetic recording medium according to claim 1, wherein a lubricant layer is further provided on the anticorrosive layer.

5. A magnetic recording medium according to claim 1, wherein the ferromagnetic metallic layer contains cobalt as a main component.

6. A magnetic recording medium having provided on a substrate a ferromagnetic metallic layer containing cobalt as a main component, a passivated cobalt layer on said ferromagnetic metallic layer and an anticorrosive layer having a thickness of 20 to 200 Å on said passivated cobalt layer, said anticorrosive layer comprising at least one anticorrosive selected from benzothiazole derivatives, benzoimidazole derivatives having at least one of amino group, nitro group, chlorine and mercapto group as substituent in the benzoimidazole skeleton, benzotriazole and its derivatives, compounds containing nitrosonaphthol as a main component, oxime compounds, phytic acids and its derivatives, quinaldinic acid and its derivatives, guinoline compounds, naphthaldehyde and its derivatives, wherein said passivated cobalt layer is made of an oxyhydroxide containing principally three- or higher-valent cobalt ions.

7. A magnetic recording medium according to claim 6, wherein said anticorrosive layer comprises at least one anticorrosive selected from 2-mercaptobenzothiazole, 2-pentylaminobenzineimidazole, 1,2,3benzotriazole, 2-nitroso-1-naphthol, 1-nitroso-2-naphthol, salicylaldoxime, α-benzoinoxime, phytic acid, quinaldinic acid, 8-hydroxyquinoline, 2-methyl-8-hydroxquinoline, naphthaldehyde and derivatives thereof.

8. A magnetic recording medium according to claim 6, wherein a lubricant layer is further provided on the anticorrosive layer.

9. A magnetic recording medium according to claim 8, wherein the lubricant layer comprises a fluorine lubricant.

10. A magnetic recording medium according to claim 6, wherein said oxyhydroxide is expressed by the chemical formula $Co_3O_4 \cdot nH_2O$ or $Co_2O_3 \cdot nH_2O$.

11. A process for producing a magnetic recording medium, which comprises forming a passivated layer made of an oxyhydroxide containing principally three- or higher-valent cobalt ions on the surface of a ferromagnetic metallic layer provided on a non-magnetic substrate, and then forming an anticorrosive layer to a thickness of 20 to 200 Å on said passivated layer by depositing an anticorrosive on said passivated layer either by directly applying said anticorrosive onto said passivated layer or by means of transfer from a coat applied on a back side of the substrate.

12. The process according to claim 11, wherein a lubricant layer is further formed on said anticorrosive layer either by direct application or by transfer from the back side of the substrate.

13. A process according to claim 11, wherein said oxyhydroxide is expressed by the chemical formula $Co_3O_4 \cdot nH_2O$ or $Co_2O_3 \cdot nH_2O$.

14. A process according to claim 11, wherein said passivated layer is formed by subjecting said ferromagnetic metallic layer to a moisture absorption treatment and a dehydrating-oxidation treatment.

15. A process according to claim 14, wherein said moisture absorption treatment is performed before said dehydrating-oxidation treatment.

16. A process according to claim 14, wherein said moisture absorption treatment and said dehydrating-oxidation treatment are performed simultaneously.

17. A process according to claim 11, wherein said anticorrosive is selected from the group consisting of benzothiazole derivatives, benzoimidazole derivatives having at least one of amino group, nitro group, chlorine and mercapto group as substituent in the benzoimidazole skeleton, benzotriazole and its derivatives, compounds containing nitrosonaphthol as a main component, oxime compounds, phytic acid and its derivatives, quinaldinic acid and its derivatives, quinoline compounds, naphthaldehyde and its derivatives.

* * * * *